United States Patent
Hutter et al.

(10) Patent No.: US 7,165,627 B2
(45) Date of Patent: Jan. 23, 2007

(54) PORTABLE AIRBORNE FIREFIGHTING AND SENSING SYSTEM

(76) Inventors: Michael David Hutter, 368 Brookside Dr., Chico, CA (US) 95928; Steven Thomas Marine, 1881 Nightsong Ln., Chico, CA (US) 95926; Richard Lawnewce Ken Woodland, 2210 Robailey Dr., Chico, CA (US) 95928

( * ) Notice: Subject to any disclaimer, the term of this patent is extended or adjusted under 35 U.S.C. 154(b) by 163 days.

(21) Appl. No.: 10/755,088

(22) Filed: Jan. 10, 2004

(65) Prior Publication Data
US 2006/0260826 A1  Nov. 23, 2006

(51) Int. Cl.
*A62C 25/00* (2006.01)
*A62C 2/00* (2006.01)
*B64D 1/18* (2006.01)
*A01G 25/09* (2006.01)

(52) U.S. Cl. .......................... 169/53; 169/44; 169/52; 239/171; 239/146; 239/149; 239/373

(58) Field of Classification Search .................. 169/53, 169/44, 52; 239/171, 146, 149, 337, 373; 244/118.1, 118.3, 129.5; 49/110, 139, 340
See application file for complete search history.

(56) References Cited

U.S. PATENT DOCUMENTS

| 4,172,499 | A | * | 10/1979 | Richardson et al. | .......... 169/53 |
| 4,195,693 | A | * | 4/1980 | Busch et al. | .................. 169/53 |
| 4,498,648 | A | * | 2/1985 | DeLuca et al. | .......... 244/118.3 |
| 4,510,714 | A | * | 4/1985 | Kasper et al. | ................. 49/249 |
| 5,878,819 | A | * | 3/1999 | Denoize et al. | ................ 169/53 |

* cited by examiner

*Primary Examiner*—Davis Hwu
(74) *Attorney, Agent, or Firm*—Roddy M. Bullock

(57) ABSTRACT

A firefighting apparatus is adapted for use in a host aircraft comprising a fuselage defining an interior and an exterior. The firefighting apparatus includes a pressurizeable retardant tank disposed in the interior of the host aircraft, the retardant tank being capable of roll-on and roll-off installation, an ejection tube in fluid communication with the retardant tank, and a door plug for mounting within a fuselage orifice in the host aircraft. The door plug provides for fluid communication of retardant from the retardant tank through the ejection tube to the exterior of the host aircraft. At least one sensor is operably connected to the firefighting apparatus to effect user-discernable data for effecting retardant delivery.

34 Claims, 8 Drawing Sheets

PORTABLE AIRBORNE FIREFIGHTING AND SENSING SYSTEM

FIELD OF THE INVENTION

This invention relates to airborne firefighting suppression systems. In particular, the invention relates to removeably mounted, portable, roll on and roll off, modular, improved airborne firefighting suppression systems.

BACKGROUND OF THE INVENTION

Fixed and rotary wing aircraft typical of the Douglas DC-6 and DC-4, Lockheed Martin P-2 Neptune, and P-3 Orion and other types of fixed and rotary wing aircraft, have in the past been extensively modified to undertake airborne firefighting operations. Typically modifications to the airframe are made to accommodate high volume water and foam retardant fluid reservoirs. These aircraft are referred to as air tankers, and their combined water and retardant delivery capacity, as well as the delivery dispersal pattern of the water on the ground, determine if the aircraft qualifies for one of several air tanker ratings, which are certified by the Interagency Air Tanker Board (IAB).

Among the many methodologies developed over years of forest fire fighting, is a constant flow retardant delivery tank system, which uses a pair of doors that open gradually to permit progressive release of the retardant mixture from within an air tanker's fluid reservoir. This constant flow water bombing methodology can counteract the forward motion of the aircraft at various speeds while maintaining an even, well grouped, user programmable, retardant dispersal pattern on the ground. One variant of such a system was disclosed by MacDonald and Neuwirth, in U.S. Pat. No. 4,936,389 which issued on Jun. 26, 1990, entitled Fluid Dispenser For An Aircraft. MacDonald discloses a system wherein a head sensor determines the level of retardant in the aircraft retardant tank and dynamically controls the aperture of the drop doors to counter aircraft forward velocity to achieve a consistent dispersal pattern. A similar constant flow system, which calculates the remaining amount of fluid within a tank relative to aircraft ground speed to achieve controlled retardant discharge is disclosed by Foy and Uglum in U.S. Pat. No. 5,320,185 which issued on Jun. 15, 1994 entitled Aircraft Fluid Drop System and also Foy and Uglum in U.S. Pat. No. 5,451,016, which issued on Sep. 19, 1995 which was also entitled Aircraft Fluid Drop System.

Another methodology used to achieve constant flow rates is disclosed by Trotter and Woods in U.S. Pat. No. 5,279,481 which issued on Jan. 18, 1994 entitled Airborne Liquid Spreading System. In the disclosed system the differential pressure across the drop doors between internal tank pressure and external ambient pressure is determined by a sensor which then relays signals to a controller that varies the aperture of the doors to maintain a constant flow rate during the drop sequence.

All the aforementioned constant flow methodologies have certain limitations and deficiencies. For example, each involve modifying the host aircraft to achieve installation. Furthermore, many of the systems referenced cannot typically undertake multiple drops from the same tank and fluid volume without returning to the tanker base for refilling.

Other systems have been conceived which require only minimal modification to the host aircraft, but such systems are generally incapable of achieving an optimal dispersal pattern conducive to IAB certification for suppressing large fires. Such a system was disclosed by Newton in U.S. Pat. No. 3,698,480 which issued on Oct. 17, 1972, entitled Dual Tank Airborne Fire Retardant Dispensing System. Newton describes a cargo aircraft with a portable dual tank dispersal system which disperses the retardant slurry using pressure stored in a high pressure vessel which uses bleed air from the engines to permit recharging of the system.

The system disclosed by Newton is similar to the Lockheed-Martin C-130 Modular Airborne Firefighting (MAFF) System, manufactured by the Aero Union Corporation of Chico Calif. The MAFF system is currently in use by the air National Guard on behalf of the U.S. Forest Service, and state government authorities. The MAFF system uses a pair of retardant ejection tubes which extend rearward and downward, over the trailing edge of the opened cargo ramp of the aircraft, and due to fluid ejection limitations and a dual discharge manifold configuration cannot achieve the desired optimal ground dispersal pattern typical of such systems. Furthermore, due to the installation methodology and configuration of the MAFF system which utilizes the rear ramp of the Lockheed Martin C-130 aircraft, substantial airframe corrosion results when the retardant is discharged and vortices carry peripheral retardant spray upward into the underside of the aircraft tail empennage. Further corrosion can also result when the MAFF system is being refilled as external retardant filling interfaces are inadequate, and overfill retardant can spill onto the cargo floor.

Despite the portability of MAFFS and other roll-on roll-off (Ro—Ro) aerial fire fighting concepts, such systems generally require opening a door or ramp at the rear of the aircraft in flight and thereby compromise aircraft pressurization. Such systems also limit aircraft operating altitudes and speed and affect handling characteristics, and can also create safety of flight concerns particularly in mountainous terrain. In some configurations the retardant discharge assembly must be deployed prior to flight in the operable position which dramatically increases drag, and again impairs aircraft handling characteristics, restricting flight altitudes to below ten thousand feet, resulting in slower transit speeds to the fire.

Most aerial firefighting systems do not have on-board dynamic mixing capabilities of the foam fire retardant chemicals and water, which must be premixed on the ground and thereby preclude dynamic configuration in flight of the retardant mixture. Richardson et al, in U.S. Pat. No. 4,172,499 issued on Oct. 30, 1979 entitled Powder And Water Mixing And Dropping System Onboard An Aircraft disclosed a dynamic, in-flight retardant chemical powder and water scooping system, which forms an integral part of a modified airframe structure. The system, however, forms part of a dedicated firefighting assembly permanently installed on the host aircraft, and does not permit the system operator to dynamically select the ratio of retardant to water mix.

Other foam chemical mixing systems for helicopter bucket type of firefighting systems are disclosed by Burchert, in U.S. Pat. No. 4,993,495, which issued on Feb. 19, 1991, entitled Apparatus For Applying Firefighting Chemicals, and in a similar system disclosed by Baker, in U.S. Pat. No. 5,385,208, which issued on Jan. 31, 1995, entitled Airborne Fire Suppressant Foam Delivery Apparatus. However, all of these systems involve modified airframes, or are helicopter based and hence are incapable of working in conjunction with a non-dedicated, Ro—Ro, high volume delivery system. Nor is a Ro—Ro fixed wing system disclosed that can carry and provide access to multiple chemicals, dyes or other powder or fluid agents in flight which could be dynamically injected in various ratios into the water reservoir based on situational requirements determined by the airtanker flight crew, or on-scene commander.

A common complaint among senior U.S. Air Force staff members and the U.S. General Accounting Office involves the diverse types, consisting of some twelve different variants, of dedicated C-130's used to fulfill unique missions. This diversity of airframe types results in a lack of fleet uniformity driving up maintenance costs, with no flexibility to undertake alternate missions. The U.S. Air Force has expressed a desire to create flexibility in fire-fighting equipment, to keep abreast of technical advances, and achieve more uniformity within its C-130 aircraft fleet. The U.S. Forest Service shares a similar perspective.

A discharge chute used to eject retardant material from an aircraft is disclosed by Hawkshaw in U.S. Pat. No. 4,671,472 issued on Jun. 9, 1987, entitled Fire Bombing and Fire Bombers. Hawkshaw disclosed the mounting and integration of an unpressurized fluid discharge chute which can form part of an existing drop tank assembly, but the system requires airframe modifications.

Other known firefighting systems use high pressure water drop or streams, particularly helicopter based systems. One such system is described by Eason in U.S. Pat. No. 3,897,829, issued on Aug. 5, 1975 entitled Airborne Fire Suppression Unit. Eason discloses a portable, articulated boom with an adjustable nozzle and water reservoir. A similar system for a modular container, and spray nozzle assembly was disclosed by Tomlinson in U.S. Pat. No. 4,090,567, which issued on May 23, 1978 entitled Fire Fighting Helicopter. However, both the Eason and Tomlinson patents describe systems which are primarily suited for lateral firefighting typical of high rise apartment buildings with limited water reservoirs, which require directed horizontal water streams, and are not capable of meeting IAB drop pattern dispersal criteria. Further, such systems cannot deliver a large volume of water as is typically required in major forest fires.

An improvement to these helicopter related firefighting problems is disclosed by Bisson, in U.S. Pat. No. 5,135,055 which issued on Aug. 4, 1992, entitled Ground And Airborne Fire Fighting System And Method Of Fighting High Rise Building Fires. Bisson discloses a stationary helicopter in hover, which is connected to a ground based pumping means and water supply, through a hose, which discharges the high pressure water through a water cannon mounted on the helicopter. Although the system disclosed by Bisson has multi-axis water stream vectoring capabilities, with variable flow rate, the helicopter is tethered to a fire hose and cannot be made portable, or independent from the water source thereby restricting the mobility of the helicopter.

Although several rotary and fixed wing, vertical discharge aerial firefighting systems disclose variable flow rate, or constant flow rate discharge means, none of them are adapted for use with Ro—Ro aircraft such as the Lockheed-Martin C-130 without modifying the airframe. For example, the Aero Union Corporation's Lockheed-Martin C-130-based Retardant Aerial Delivery System's (RADS) is only partially Ro—Ro, and requires extensive modification to the lower fuselage to create the opening for the tank assembly which is installed for firefighting and removed when the aircraft is required for cargo operations.

Herlik in U.S. Pat. No. 5,549,259, issued on Aug. 27, 1996, entitled Innovative Airtankers And Innovative Methods For Aerial Firefighting, discloses a system reportedly able to precisely drop measured amounts of liquid using an infra-red vision system, computerized aiming references and high capacity impellers mounted in the discharge tubes. A similar, although lesser capability is also disclosed by Denoize et.al. in U.S. Pat. No. 5,878,819 issued on Mar. 9, 1999 entitled Device For Assisting With The Extinguishing Of Fires By Water Bombing Aircraft which integrates a fire detection sensor with a GPS aircraft positioning system and a geographic information system linked to a computer based aircraft route, drop coordination, and egress planner. However, Denoize et.al. fail to disclose beneficial features, such as temporary, portable, modular, non-dedicated, Ro—Ro, pressurized fuselage mounting methodology for a fully integrated fire retardant delivery system including control interfaces, with global positioning system capability for precision delivery and ground asset location, with fire detection, targeting, and vegetative fuel characterization sensors, telemetry antennas, and/or computer processing systems, which are not affected by mechanical failure, or inoperability of the host aircraft.

In conjunction with the aerial delivery of retardant, current firefighting operations for non-dedicated, Ro—Ro aircraft (e.g., MAFFS) and modified aircraft (e.g., RADS) are hindered by a lack of on-board infra-red, hyperspectral, and other spectral sensors for spot fire detection, radiant and kinematic heat mapping, fire perimeter mapping, ground crew detection, vegetative fuel load characterization, retardant targeting, and retardant delivery assessment capabilities.

Further, in conjunction with the aerial delivery of heavy payloads of retardant, current airborne firefighting operations have on occasion proven to be dangerous for ground crews engaged in fighting fires, or civilian populations within the vicinity of aircraft water bombing operations.

Further, In order for several aircraft and ground crews to benefit from geo-referenced infra red detection data, and GPS targeting coordinates obtained by only one aircraft equipped with a sensor and data processing system, requires the integration of a low cost, universal on board tactical line-of-sight (LOS) and/or, over-the-horizon (OTH) imagery, data, transmission and display information system.

Accordingly, there is a continuing, unaddressed need for an improved firefighting apparatus capable of temporary use on various host aircraft and capable of effective water and/or retardant delivery from the air.

Additionally, there is a continuing, unaddressed need for a firefighting apparatus and system capable of common aircraft roll-on, roll-off, non-dedicated operation, without requiring airframe modifications.

Additionally, there is a continuing, unaddressed need for a firefighting apparatus and system capable of providing for pressurized fuselage based, Ro—Ro aerial fire fighting.

Additionally, there is a continuing, unaddressed need for a non-dedicated, Ro—Ro firefighting apparatus and system providing for constant flow discharge or operator-definable discharge from a pressurized fuselage.

Additionally, there is a continuing, unaddressed need for a firefighting apparatus and system, incorporating fire detection sensing and targeting capabilities, and/or a data/imagery telemetry system integrated into a single portable, pressurized, pallet assembly which can move seamlessly between aircraft without requiring airframe modifications.

Finally, there is a continuing, unaddressed need for a firefighting apparatus and system which does not require airframe modifications, does not restrict normal aircraft performance, does not decrease aircraft safety margins, does not cause airframe corrosion damage, and does not inhibit mission readiness by being dedicated to a single aircraft through airframe modification.

SUMMARY OF THE INVENTION

The present invention solves many of the problems encountered with current permanent and roll-on aircraft firefighting equipment. In one embodiment the firefighting apparatus of the present invention is adapted for use in a host aircraft comprising a fuselage defining an interior and an exterior. The firefighting apparatus includes a pressurizeable retardant tank disposed in the interior of the host aircraft, the retardant tank being capable of roll-on and roll-off installation, an ejection tube in fluid communication with the retardant tank, and a door plug for mounting within a fuselage orifice in the host aircraft. The door plug provides for fluid communication of retardant from the retardant tank through the ejection tube to the exterior of the host aircraft. At least one sensor, and one telemetry and communications system can be operably connected to the firefighting apparatus to effect user-discernable data for effecting retardant delivery.

DETAILED DESCRIPTION OF THE INVENTION

The invention is now described in terms of the FIGURES to more fully delineate in more detail the scope, materials, conditions, and methods of the present invention. Many of the parts and components of the present invention are hereinafter described as being "assemblies." As used herein, the word "assembly" or "assemblies" refers to the totality of related parts and pieces related to a given component and its operability, and is not to be considered as limiting to a particular part, piece, or operation.

In general, the invention comprises an improvement to fire fighting systems and apparatuses adapted for airborne firefighting. Specifically, the systems and apparatus of the present invention can provide for a non-dedicated, portable, roll-on, roll-off (Ro—Ro) aircraft installation of an advanced, integrated airborne firefighting system as disclosed more fully below. The apparatus of the present invention can provide for IAB certified, high volume, variable flow rate, constant flow, fire retardant delivery capability. The system provides a substantial improvement in Ro—Ro retardant dispersal patterns without impeding flight performance of the aircraft and without creating significant drag on the aircraft. The apparatus and system can also eliminate or minimize spillage during filling procedures and delays for tank recompression. The apparatus can provide for dynamic in flight injection of chemicals, can preserve airframe pressurization, and can provide for vectoring corrosive retardant away from the airframe during discharge operations.

Figure 1:
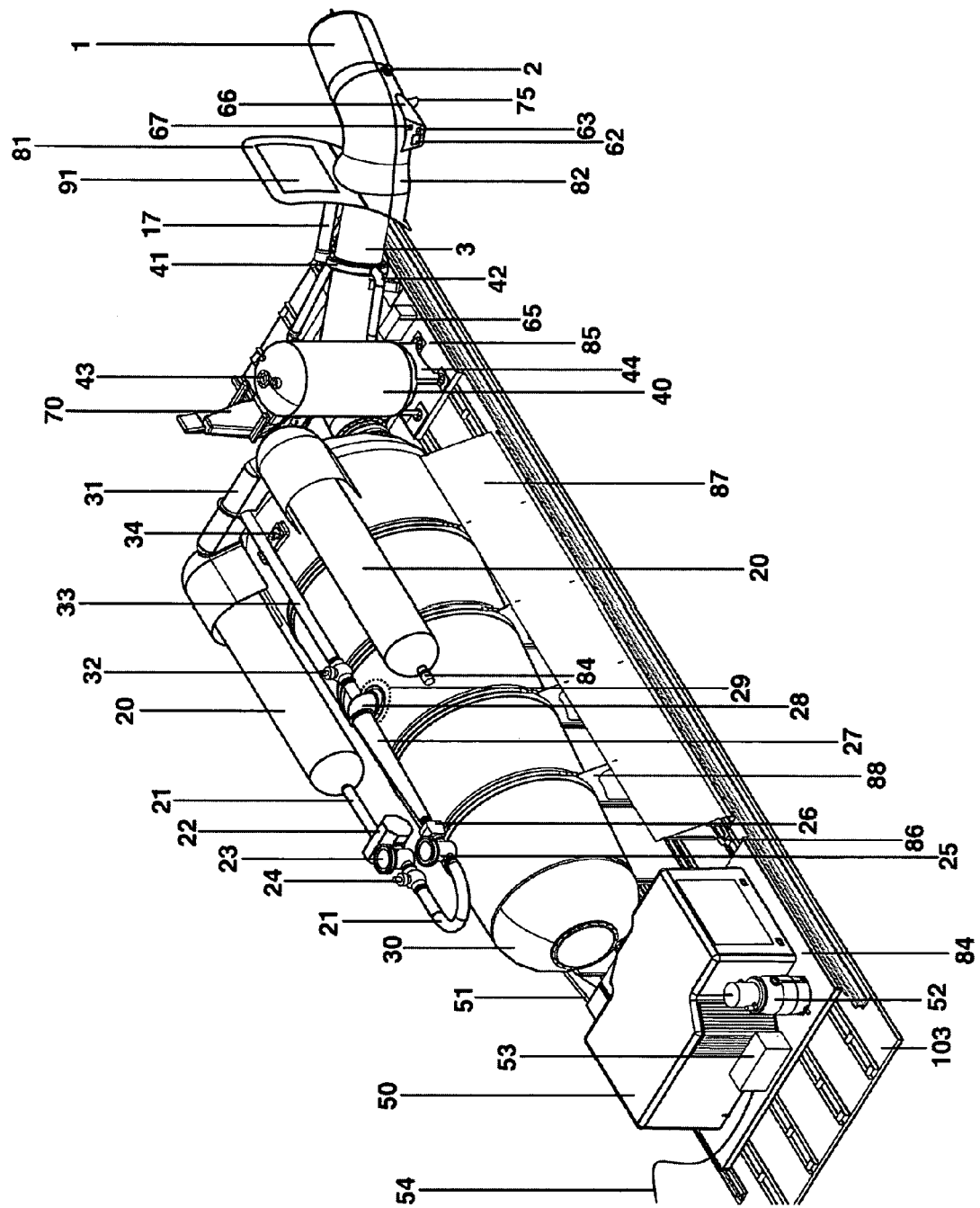
FIG. 1 is a perspective view of an apparatus of the present invention.
Figure 2:
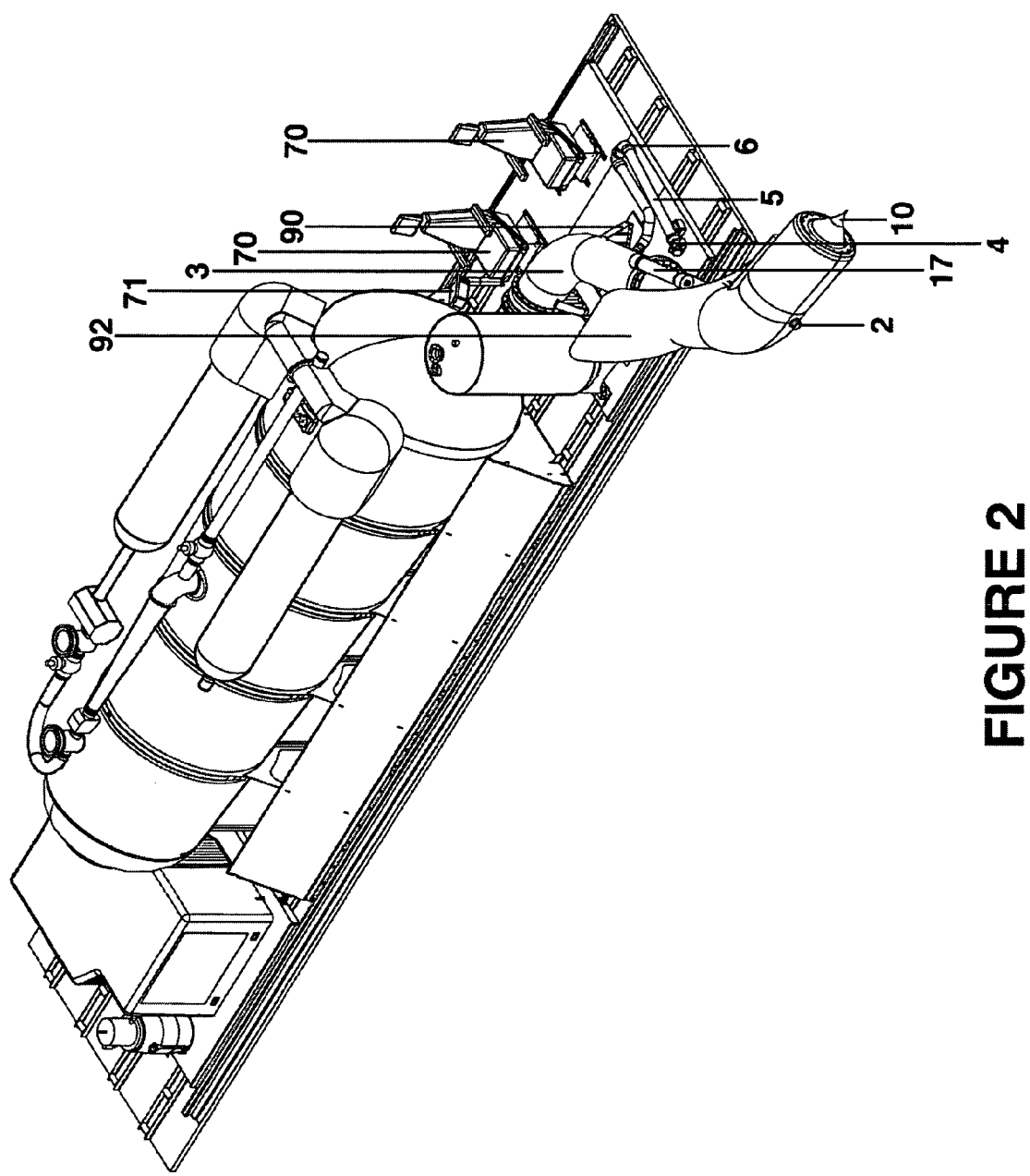
FIG. 2 is another perspective view of an apparatus of the present invention.
Figure 3:
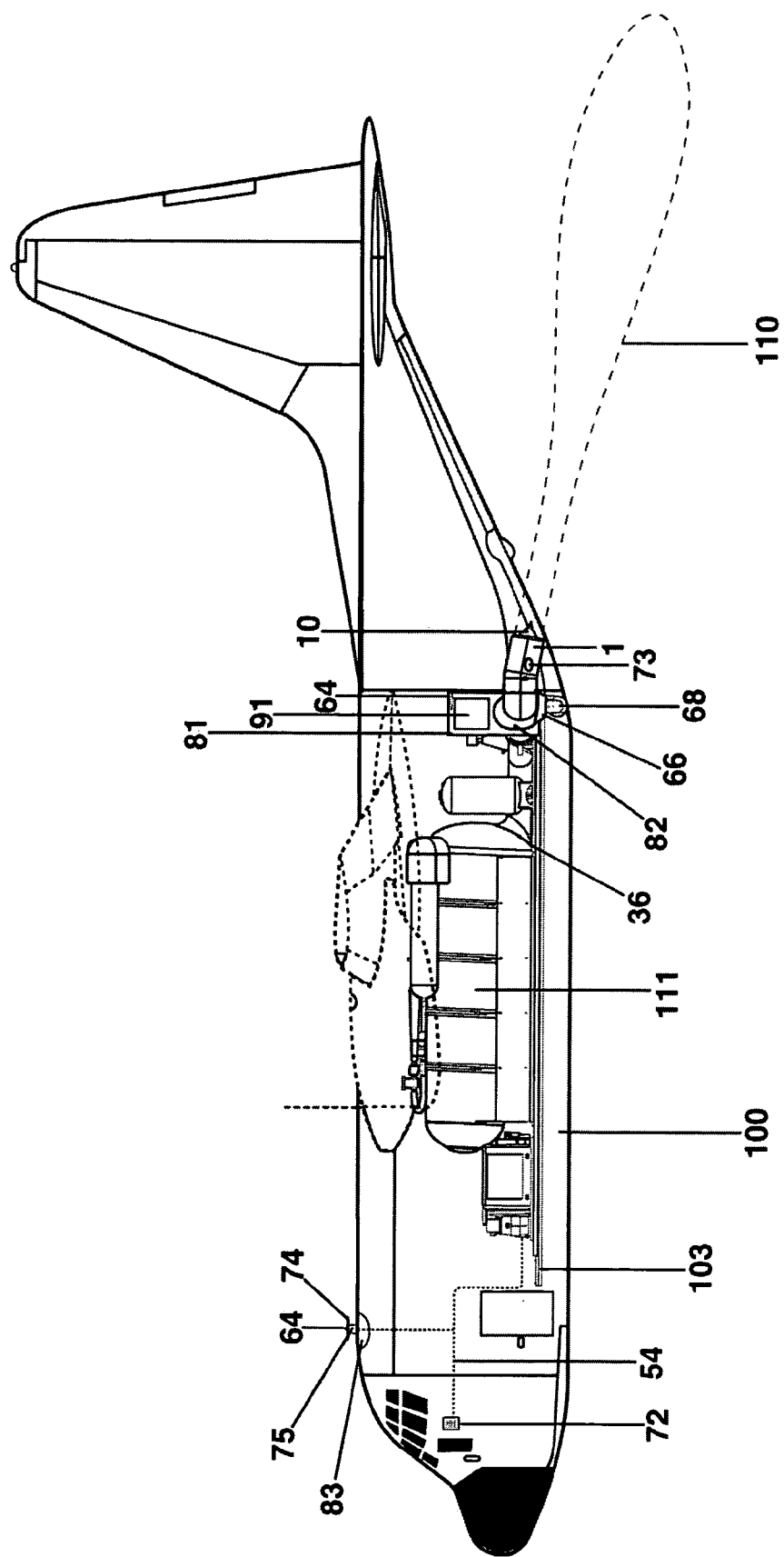
FIG. 3 is a left side view of the present invention as mounted on a Lockheed Martin C-130 aircraft.

In one embodiment, as shown in FIG. 1, the apparatus 111 of the present invention provides for an improvement in the configuration, capability, and operation of portable, aerial firefighting systems and associated geo-located targeting equipment, and employment methodologies. The system and apparatus of the present invention is intended for use in aircraft, either fixed wing or rotary wing aircraft, both existing and future. For example, as shown in FIGS. 1 through 3, the system and apparatus of the present invention can be used with a Lockheed-Martin C-130 aircraft 100, which can be equipped with a cargo handling system, such as an A/A32H-4A cargo handling system, and be capable of accommodating the present invention on a conventional pallet, such as a 463L-compliant forward pallet 84 and aft pallet 85. Pallets 84 and 85 can be mounted to a central mounting system comprised of a plurality of load bearing "T" extrusion frames 86, which lighten the weight of the installation assembly. The apparatus can be rolled on to and off of the aircraft floor 103 to enable temporary installation into the interior of the host aircraft.

Figure 4:
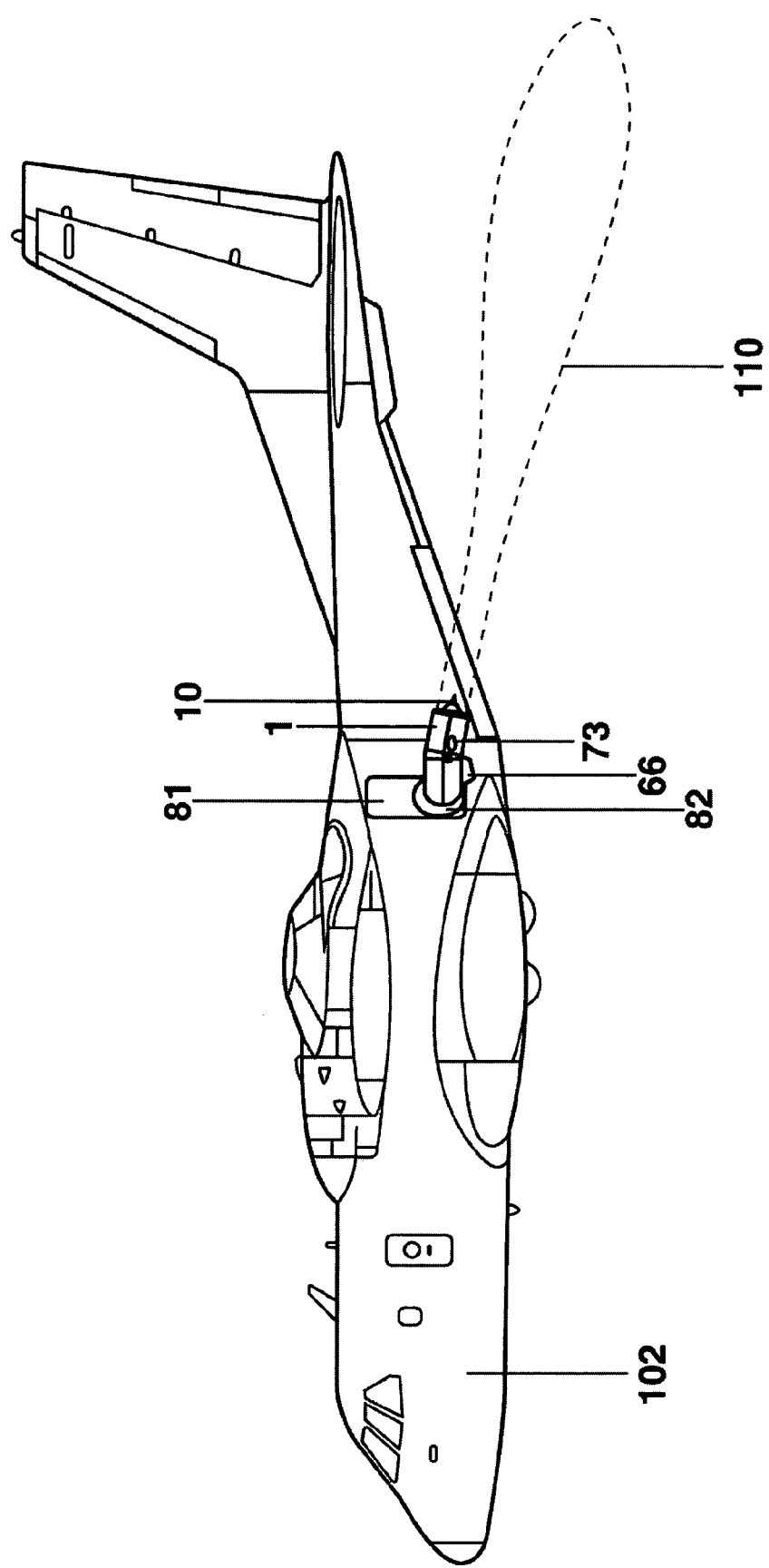
FIG. 4 is a left side view of the present invention as mounted on an EADS/CASA C-235/295 aircraft.
Figure 5:
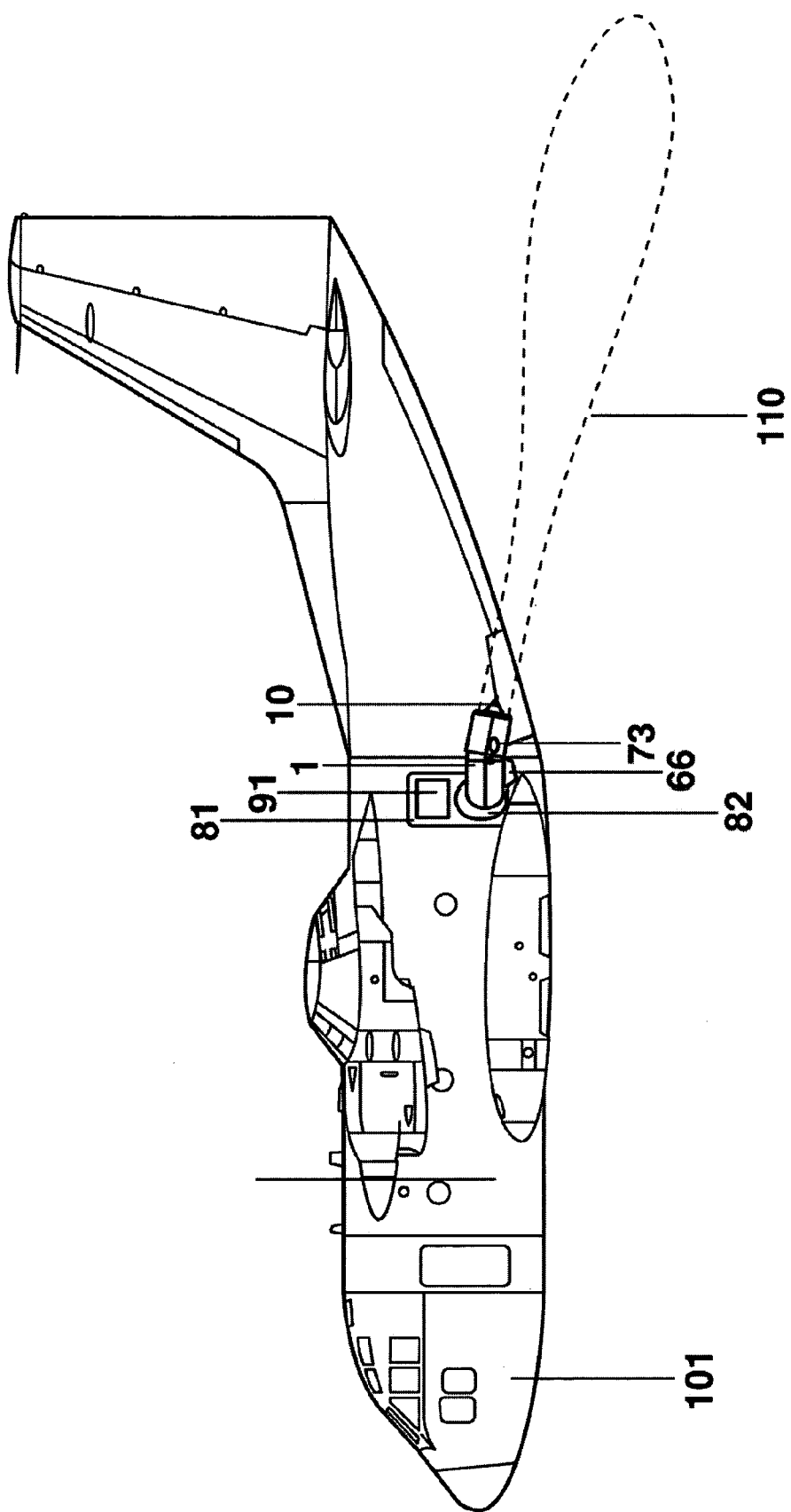
FIG. 5 is a left side view of the present invention as mounted on a Alenia/Lockheed Martin C-27J aircraft.

The system and apparatus of the present invention is scalable and can be used on any suitable aircraft adaptable for airborne firefighting with the apparatus of the invention, including, for example, a Boeing C-17, a Boeing CH-47 helicopter, a Boeing V-22 Tilt-rotor, an EADS/CASA C-235/295 aircraft 102 as shown in FIG. 4, an Alenia C-27 aircraft 101 as shown in FIG. 5, or other rear loading aircraft having sufficient interior space to accommodate smaller or larger versions of the firefighting apparatus 111 of the present invention. Other cargo handling systems can be employed as mounted on various aircraft floors 103. In general, aircraft of the type described herein have a fuselage defining an interior and an exterior of the aircraft.

The pallet assembly can include multiple part pallets, such as forward pallet 84, an aft pallet 85, but can be an integral one piece pallet assembly. Regardless of the specific aircraft cargo handling system, the pallet assembly serves to accommodate and otherwise integrate the various modules and components of the apparatus 111 of present invention into a Ro—Ro firefighting apparatus.

To avoid the necessity of modifying the airframe of the host aircraft, thereby maximizing the adaptability of the apparatus 111 of the present invention, the apparatus 111 includes a segmented door plug assembly 81 that can mount in a fuselage orifice of the host aircraft, thereby providing for sealing that can permit the interior of the aircraft to be pressurized. As shown in FIGS. 1 and 3, for example, the door plug 81, sometimes referred to as a hatch, is adapted to provide for fluid communication of firefighting fluids from the pressurized interior of the host aircraft to the exterior of the host aircraft 111. The door plug 81 permits quick, efficient temporary use of a side door opening of an aircraft for fire retardant ejection, for example, rather than using the rear ramp of the aircraft as has been done in the past. The outboard discharge manifold assembly 1 extends externally through the door plug 81 to effect retardant ejection and dispersal.

While it is contemplated that door plug assembly 81 could be one-piece, such a door plug could be difficult to install and de-install. By having a segmented door plug 81, each segment can be installed separately, possibly by hand with minimal aid from mechanized sources such as cranes or fork lifts. For example, in one embodiment, the door plug 81 is segmented into top and bottom halves, each half being conformable to the outside dimension of the outboard discharge manifold assembly 1, and sized to fit with the other half into a predetermined fuselage opening size, such as the side door of a C-130. As shown in FIG. 2, in another embodiment which achieves pressurization functionality the door plug is an integral single section door plug 92, which is fully integrated with the outboard discharge manifold assembly 1 of the ejection tube, as described in more detail below, and installed as one piece of equipment. Fit and construction of the door plug assembly can be by means known in the art to permit secured, pressurizeable installation, depending upon the characteristics of the fuselage opening in the host aircraft.

An external discharge cowling 82 can be used to help assure an aerodynamic interface of the door plug 81 and the outboard discharge manifold assembly 1. Segmented door plug 81 can have two or more parts or segments, and one of the segments can have an observation window 91, as shown in FIG. 1. The door plug 81 can be shaped as necessary to be adapted to replace existing doors and provide a pressurized fit in existing door openings, for example the side door opening of a C-130 aircraft, as shown in FIG. 3.

Another benefit of having an outboard discharge manifold assembly 1 extending externally through the door plug 81 is provision of a better optimized trajectory 110 of the foam and/or retardant and/or water fire retardant fluids, hereinafter referred to simply as "retardant". The outboard discharge manifold assembly 1 permits the retardant to be directed away from the lower side of the tail empennage of aircraft 100 thereby preventing retardant from being sprayed into the tail as is known to occur in current airborne firefighting systems.

Other features of a preferred apparatus and system of the present invention are now described with respect to the beneficial feature of a segmented door plug 81 adapted for passage of retardant from the interior of a host aircraft to the exterior of the host aircraft through an ejection tube. In general, the various features and components of one embodiment of the apparatus correspond to one or more of a retardant tank assembly, a discharge assembly, a pintel assembly, a foam injection assembly, a compressor assembly, a sensor assessment and targeting assembly and a control assembly.

As depicted in FIGS. 1–3, a retardant tank assembly consists of a high pressure fluid reservoir retardant tank 30, for holding high pressure fluid. The tank 30 can be made of suitable materials depending on the fluid and the pressure, but in a preferred embodiment it can be fabricated of aircraft certified metals. In one embodiment composite materials can be used, such as fiber reinforced graphite and Kevlar, to minimize weight (i.e., minimize the weight to strength ratio). Tank 30 can be supported and otherwise fixed by means known in the art to the pallets 84 and 85 by a plurality of transverse cradle braces 88, which are connected and otherwise reinforced longitudinally by cradle shear panel 87.

The high pressure fluid reservoir tank 30 can be configured to have a lower sump 36, to facilitate egress of all fluids during ejection operations. For example, as shown in FIGS. 1 and 3, tank 30 can have a generally tapered conical shape with the narrow end of the cone elevated, such that, at least on a lower interior surface thereof, and in generally level flight, fluid collects at a lowest point, such as sump 36 corresponding to the point of exit out of tank 30.

The high pressure fluid reservoir tank 30 can be pressurized with compressed air from air stored within at least one, but preferably two or more high pressure air reservoir tanks 20. In general, other gases could be used for pressurization, but air is preferred. Air from air reservoir tanks 20 pressurizes high pressure fluid reservoir tank 30 to effect pressurized ejection of the fire retardant fluid from high pressure fluid reservoir tank 30. Air reservoir tanks 20, can be fabricated of aircraft certified metals, but in a preferred embodiment utilizes composite materials such as fiber reinforced graphite and Kevlar.

High pressure air reservoir tank 20 can be connected to a high pressure compressed air feed system through connecting high pressure air piping 21. Air pressure can be controlled by an air pressure regulator 22, and safeguarded from over compression by a first stage rupture disk 23, and a second stage rupture disk 25. Unintentional discharge of air into the high pressure fluid reservoir tank 30 can be controlled by a high pressure arming valve 24 and a check valve 26. Once compressed air is permitted into the high pressure fluid reservoir tank 30, it can undergo a reduction in pressure and distribution expansion through an inlet air expansion horn 27, from which it can enter an air inlet manifold 28, which can be connected to a high pressure air diffuser assembly 29 located on the upper inside surface of the high pressure fluid reservoir tank 30.

A preferred embodiment of the present invention utilizes a plurality of high pressure air reservoir tanks 20 which can be connected by high pressure air piping 21 which can be protected from damage during system use and loading by a high pressure flex line protective fairing 31. High pressure air reservoir tanks 20 can be further connected to an aircraft certified on-board compressor 50, typical of those manufactured by the Bauer Corporation of the United States, which can be equipped with a condensate collection tank 52. Compressor 50 can be employed in flight while the host aircraft is pressurized to effect the pressurization and transfer of air through air compressor piping 51 to the high pressure air reservoir tanks 20 where it is stored until released into the high pressure fluid reservoir tank 30. Compressor 50, and high pressure air control means can be powered and actuated through a power distribution/supply box 53 which can be connected to the host aircraft and system components through a power/data cable interface 54.

The discharge assembly of the present invention includes an ejection tube preferably comprising an inboard discharge manifold assembly 3 and an outboard discharge manifold assembly 1, the former being disposed in the interior of the host aircraft when in use, and the latter being disposed exteriorly of the host aircraft when in use. The ejection tube is in fluid communication with the retardant tank to effect fluid discharge from the retardant tank to the exterior of the aircraft. The inboard discharge manifold assembly 3 can be supported by means known in the art such as by a plurality of discharge manifold structural support bracing 90, which can transit from the interior to the exterior of the host aircraft through the segmented door plug 81.

The outboard discharge manifold assembly 1 of the ejection tube can be equipped with a fill/overfill port, such as an integrated left fill/overfill port 2. In the case of a Lockheed Martin C-130 and like host aircraft, the discharge assembly can also have a right fill/overfill port 4, including a right fill/overfill pipe 5, which can be articulated into its deployed position through the aircraft fuselage, such as through an open paratroop doorway on the opposite side of the aircraft fuselage during ground based filling operations by means of a right fill/overfill pipe hinge 6.

The high pressure fluid reservoir tank 30 can be connected to the fill/overfill pipes through a vent overfill line 33, which can be regulated by means of a vent overfill valve 32 to prevent inadvertent back slosh of the retardant fluid. During and after fill operations a fluid level transducer 34 can monitor the quantity of retardant in the high pressure fluid reservoir tank 30, which in turn can be transmitted to other control units, such as an internal loadmaster control interface 79, a quantity indicator, and an externally mounted fill volume indicator and intercom jack 73, which can be located on the outboard discharge manifold assembly 1.

The pressurized and segmented door plug 81 can be equipped with a pressurized observer window 91, to permit an operator to monitor and otherwise manually observe retardant discharge operations in flight.

Figure 6:
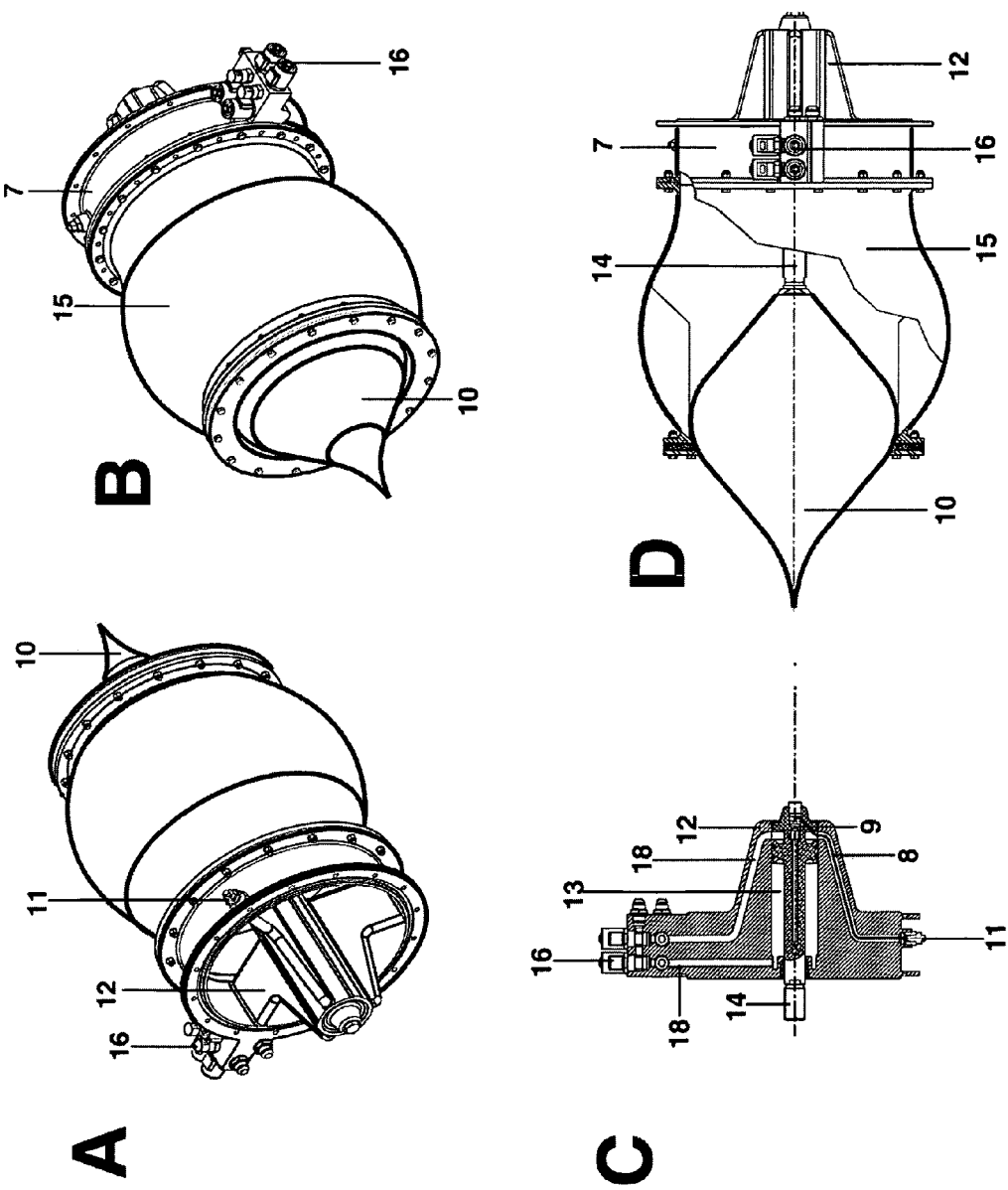
FIGS. 6A–6D show side, section and perspective views of a nozzle assembly of the present invention.

As depicted in FIGS. 2 and 6, a preferred embodiment of the present invention can have a variable flow, constant flow rate retardant ejection pintel assembly comprised of a throttle body 15, which houses various actuation components and the pintel 10. The pintel 10 can be actuated in a linear fashion along the longitudinal axis of the throttle body 15 to affect changes in throttle aperture thereby achieving operator-definable dynamic control over the amount of retardant delivered at any given time.

The actuation of the pintel 10 can be achieved by a pintel shaft hydraulic cylinder 13 which can house a pintel actuator shaft 14 which can be connected to the pintel 10. Actuation control of the hydraulics is accomplished by means of an aperture flow control assembly 7 attached to the forward section of the throttle body 15, which provides a mount for the hydraulic position control valves 16 and spider vane assembly 12, which houses the pintel shaft hydraulic cylinder 13, and provides an internal conduit for the spider vane hydraulic line 18, and spider vane electrical wire 8, to affect control of the pintel actuator shaft 14. The hydraulic position control valves 16 are electrically powered through an electrical connector 11, and the pintel actuator shaft 14 position can be relayed by means of a spider vane position sensor 9. Hydraulic fluid pressure and control relay of the hydraulic position control valves 16 can be achieved by means of an inboard pintel hydraulic control assembly 17 mounted to the upper surface of the inboard discharge manifold assembly 3.

Figure 7:
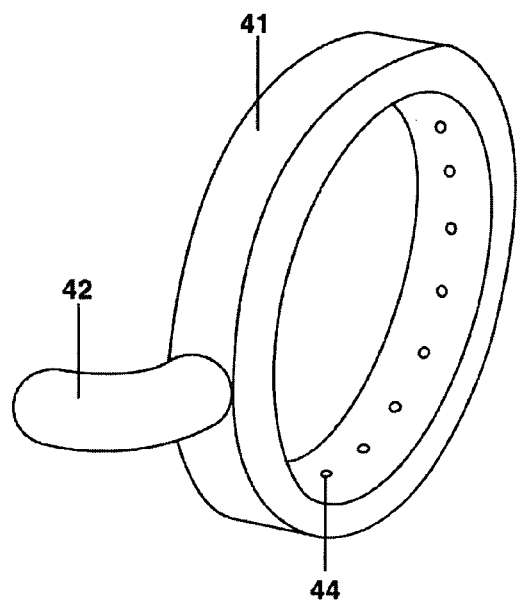
FIG. 7 is a perspective view exhibiting the diffuser array of the chemical/foam injection collar assembly.

As depicted in FIGS. 1, 2, 3, and 7, in order to enhance the firefighting properties of the retardant fluid mixture carried by the host aircraft, a preferred embodiment of the present invention incorporates an on board foam concentrate or chemical injection assembly comprised of a foam concentrate tank 40, which can be attached to the aft pallet 85, by means of foam tank bracing 89. The foam concentrate tank 40 provides the capability for the host aircraft crew to dynamically inject various chemicals into the water or retardant stream through a foam injection collar, as shown in FIG. 7. A plurality of inlet foam injection module infusion port(s) 44 arrayed around the inside periphery of the foam injection module 41, which can be integrated within the inboard discharge manifold assembly 3, tube and connected to the foam concentrate tank 40, by means of a foam concentrate pipe 42. The foam concentrate tank 40 can be filled by means of a foam fill port 43, which can connect to a ground based hose assembly with a built in overflow vent and pipe which can pour excess chemical/foam concentrate fluid through the open door orifice to the outside of the aircraft during foam filling operations.

As depicted in FIGS. 1, 3, 4, and 5, in order to enhance the retardant delivery accuracy and connectivity of the host aircraft within the aerial firefighting theater, a preferred embodiment of the present invention can incorporate an on-board sensor and communications suite equipped with various sensors known in the art, operably connected to the firefighting apparatus. By "operably connected" means installed, affixed, or otherwise provided for by means known in the art to be operable in the firefighting system. Sensors can include either a fixed or steerable gimbal based hyperspectral/infra red electro-optical sensor 62 package typical of those manufactured by Space Instruments Inc. of Encinitas, Calif., or Flir Systems Corporation of Portland, Oreg., and a ballistic winds LIDAR/ranging laser assembly 63, typical of those manufactured by Coherent Technologies Of Boulder, Colo., and other optical or radar sensors, including a day/night video camera/spotting scope 67, all of which can be housed within an aerodynamic sensor mounting fairing 66 behind multiple optical glass plates to effect the gathering of kinematic/radiant heat signature imagery, vegetative fuel loading, wind dynamics, dynamic topographic mapping, and situational awareness imagery being correlated with an inertial navigation and GPS unit typical of those manufactured by Northrop Grumman of Northridge, Calif. As depicted in FIG. 3, the electro-optical or radar sensor systems may also be integrated within a steerable, articulated electro optical/radar gimbal 68 typical of those manufactured by the Flir Systems Corporation of Portland Oreg., or the General Atomics Corporation of San Diego Calif.

The sensor assembly can also be fix mounted in a non-articulated, forward, side or downward fashion familiar to those skilled in the art of sensor mounts, and affixed to either the left or right side pressurized and segmented door plug 81, through an optical glass plate mounted in lieu of the pressurized observer window 91, or the left side external discharge cowling 82, or the outboard discharge manifold assembly 1.

The imagery and laser positioning data can be correlated to the absolute coordinates of the earth, and the relative coordinates of the host aircraft by means of at least one and preferably two temporarily installed upper ditching hatch plugs 83, typical of the Unicom antenna ditching hatch manufactured by the Aerospace Integration Corporation of Crestview, Fla., which can provide a mounting surface for an integrated antenna suite consisting of a GPS antenna 64, a SATCOM antenna 74, and/or a VHF/UHF line-of-sight antenna 75.

The hatch plug 83 can also provide the host aircraft with the ability to transmit and receive critical targeting and positioning imagery and data relative to fire phenomena, ground crew locations, flight hazards, and/or other georeferenced data to other aircraft and ground based firefighting personnel. The means for processing of the imagery and other data, as well as GPS and communications radio transceiver hardware, can be housed within an integrated sensor, communications, and GPS LRU'S 65 hardware suite that can be located on either the forward or aft pallet 85, and connected to related sensors and GPS antenna 64, SATCOM antenna 74, and VHF/UHF line-of-sight antenna 75, by a power/data cable interface 54. Control of the subject sensor suite, and/or a communications and telemetry system can be effected by the loadmaster, co-pilot, or other crew member through at least one and possible several, temporarily mounted aft end or cockpit LCD targeting display 72 interfaces typical of those manufactured by the BARCO Corporation of Diluth Ga. Such a system can have a built-in processor and touch screen interface.

A cockpit LCD targeting display 72 can be equipped with a moving map display, and imagery/data software package typical of the U.S. Air Force's Falcon View software produced by the Georgia Technology Institute to undertake GPS correlated pre-delivery retardant run analysis of the target area using Defense Mapping Agency underlay maps to identify hazards, and optimal target location for the retardant drop. The cockpit LCD targeting display 72 can also be equipped with other timing, position, winds, and navigational data to assist the flight crew in jettisoning the retardant at the exact moment over the desired target. The configuration of sensors, and the data output as currently represented in a preferred embodiment of the present invention is considered minimal and the sensor and communications suite can be substantially augmented to embrace additional workstations, consoles, processing, sensing capabilities, and can undertake advanced command and control functions as required.

Figure 8:
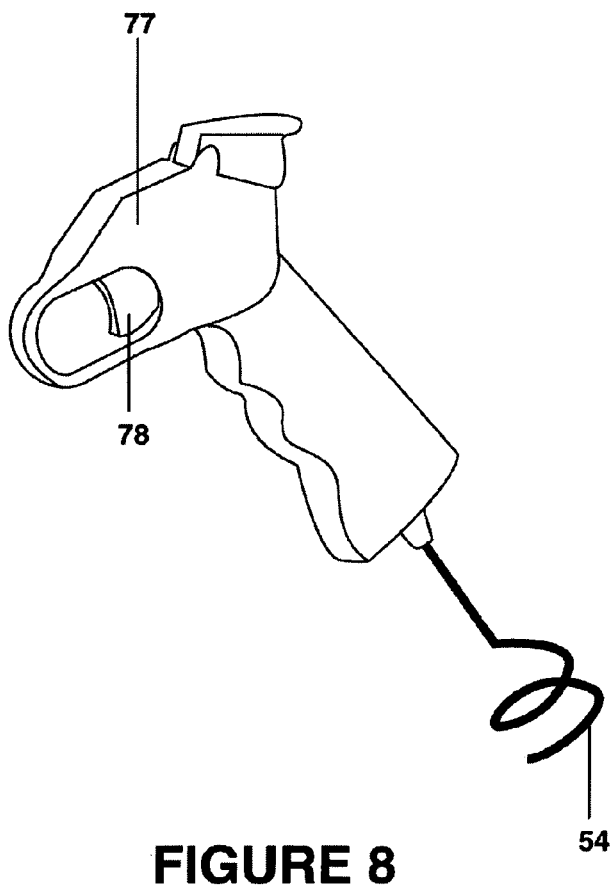
FIG. 8 is a perspective view of the flight crew and operator joystick with electrical data cord connection.
Figure 9:
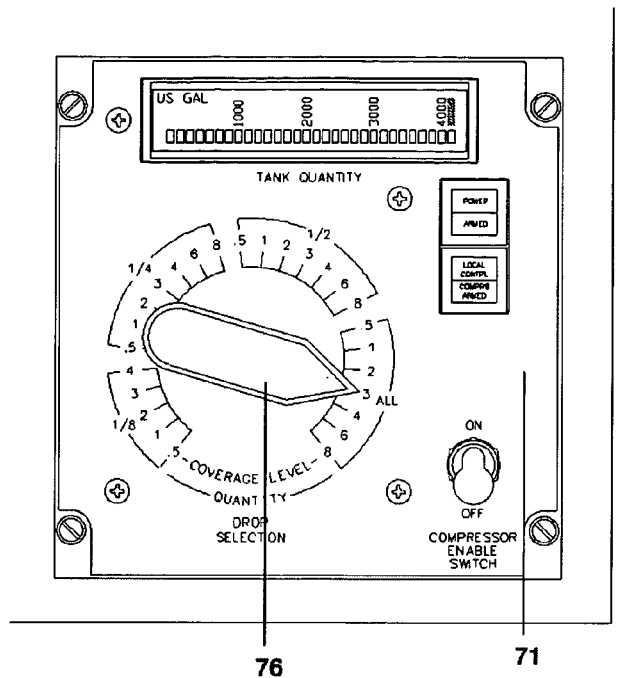
FIG. 9 is a view of the cockpit control interface plate depicting overall control interface and drop selector switch.
Figure 10:
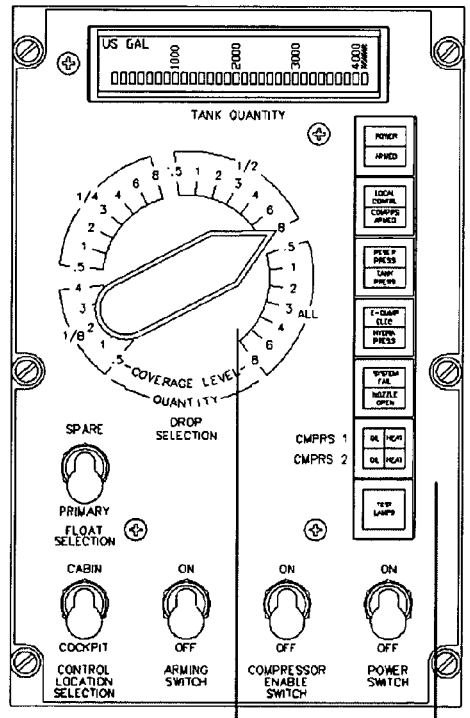
FIG. 10 is a view of the loadmaster control interface plate depicting overall control interface and drop selector switch.

As depicted in FIGS. 1,2 3, 8, 9, and 10, in order to control the overall assembly and individual components of the aerial firefighting apparatus, the preferred embodiment of the present invention incorporates a control assembly comprising at least one and preferably two or more crew chairs 70 to which can be fastened a temporary cockpit control/display interface assembly 71 a temporary control yoke or chair mounted cockpit LCD targeting display 72 and/or a permanently affixed loadmaster control interface assembly 79 equipped with various tactile switches and indictor panels but comprising a minimum of at least one, quantity selector switch 76, as depicted in FIG. 9. Further control over retardant delivery operations for standard or emergency jettisoning can be undertaken from a long cord tethered joystick 77 equipped with a joystick trigger 78, as depicted in FIG. 8, to enable user definable, complete or partial discharge of the retardant payload by depressing the joystick trigger 78, for as long or short a time as required.

As can be understood, therefore, from the above description, a preferred embodiment of the present invention having roll-on, roll-off capability does not prevent the host aircraft from undertaking alternate missions not related to fire fighting, and, the firefighting capability is not hindered due to aircraft mechanical failure when another aircraft of similar type is available.

Furthermore, the present invention, with means for ejecting retardant through a pressurized door plug permits variable discharge, constant flow, high capacity retardant delivery from a pressurized aircraft.

Furthermore, the present invention can provide a portable means for detecting fires using infra-red or other spectral and radar sensors to characterize terrain, or detect, and geographically reference, a fire's hot spots. The sensing system can form a part of the palletized, rapidly loaded, roll-on, roll-off mounting and installation system.

Furthermore, the problem of overfill spillage onto the floor of the aircraft due to improper or a lack of external vent piping, can be eliminated by the present invention through the incorporation of an overfill vent and hinged refilling pipe to funnel excess retardant off board away from the aircraft.

Furthermore, the problem of providing costly infra-red or hyperspectral sensors for detecting fire hotspots, vegetative fuel loading and other fire phenomena in conjunction with data transmission and GPS antennas without modifying the aircraft, can be achieved by the present invention by incorporating a roll-on, roll-off, non-dedicated, pressurized side door plug and upper ditching hatch mounted with GPS antenna and telemetry antenna. Such antenna and telemetry antenna can be that disclosed by Woodland in U.S. Pat. No. 5,927,648, which was issued on Jul. 27, 1999, and entitled Aircraft Based Sensing, Detection, Targeting, Communications, And Response Apparatus, which is hereby incorporated herein by reference.

In a most preferred embodiment, the integration of all the foregoing components achieves the primary objective of an integrated aerial firefighting system which can accommodate aircraft interoperability (i.e., rapid installation in an alternate aircraft) without airframe modifications to undertake fire detection, fuel loading assessment, GPS-aided retardant delivery targeting, GPS-correlated personnel location, GPS-correlated asset location, inter-aircraft data telemetry, and variable flow, constant flow fire retardant delivery capabilities from a pressurized aircraft, including dynamic chemical injection, and in-flight retardant tank re-compression.

Furthermore, the present invention can also solve the problem of variable flow rate using a variable discharge, constant flow, high capacity nozzle assembly with a remotely actuated pintel assembly, and emergency manual discharge capabilities. The present invention can also solve the problem of in-flight spray and associated airframe corrosion damage by integrating a rearward and downward oriented variable aperture nozzle assembly below and outward from the fuselage away from adverse vortices emanating from the lower side of the aircraft.

In all configurations contemplated, the ejection of rearward discharged, in-flight operator definable, high pressure, variable flow, and constant flow rate retardant can be achieved by the present invention by integrating a fluids reservoir, a variable rate, multiple-choice retardant foam or chemical storage reservoir and injection system, a compressor and high pressure main compressed air storage reservoir, crew seating and control interfaces attached to the palletized firefighting system, and a flight crew remote, variable flow rate selectable dump trigger control interface.

METHOD OF OPERATION

The installed airborne firefighting apparatus 111 of the present invention can be mounted on most rear ramp and a few side cargo door equipped airframes by methods familiar to those skilled in the art of cargo loading. In general, prior to the commencement of any loading activities, the host aircraft would undergo a pre-flight check thereby preventing unnecessary loading and unloading of the firefighting apparatus should the aircraft have a mechanical problem. Once pre-flight diagnostics for the host aircraft are verified, a loading specialist can move the aerial firefighting apparatus from storage aboard a "K" loader or similar trailer assembly to the aircraft, for example out to the rear loading ramp of a Lockheed-Martin C-130 aircraft 100, or other comparable aircraft like a Boeing C-17, an EADS/CASA C-235/295 aircraft 102, an Alenia C-27 aircraft 101, or other side cargo loading airframe.

Once in position behind or to the side of the aircraft, the palletized assembly can then be elevated into position if necessary whereupon it can interface with a cargo handling system, such as an A/A32H-4A cargo handling system or other cargo handling system. The installed airborne firefighting apparatus 111, which can be affixed to the forward pallet 84 and aft pallet 85, can then be secured to the host aircraft floor 103 through conventional cargo lock restraints.

As an alternative to using a "K" loader or other loader assembly, the present invention can also incorporate an integrated loading and wheel assembly to undertake self-loading functions as is known in the art for other cargo loading operations.

Once the installed airborne firefighting apparatus 111 is secured aboard the host aircraft, the outboard discharge manifold assembly 1 can be attached to the inboard discharge manifold assembly 3, through the open paratroop door or other orifice and secured in place. To achieve aircraft pressurization the segmented door plug 81 or integral single section door plug 92 can be installed in place of an existing side door, such as an open and locked in place paratroop door, or other removed door. Once the door plug is installed, the inboard discharge manifold assembly 3 can be secured about the interior periphery of the lower and upper parts of the segmented door plug 81 and the outboard discharge manifold assembly 1 can be secured to the inboard discharge manifold assembly 3 by suitable means known in the art, such as by bolting, screwing, or otherwise affixing each component.

At this juncture in the installation process the power distribution/supply box 53 can be connected to an aircraft power receptacle and other power/data cable interface 54 connections can be made to the cockpit control/display interface assembly 71, the cockpit LCD targeting display 72, the loadmaster control interface assembly 79, and/or the joystick 77. The pintel electrical connector 11, and other hydraulic connections can also be made at this time.

At this juncture of the installation process the upper ditching hatch plug 83, and associated SATCOM antenna 74, VHF/UHF line-of-sight antenna 75, and GPS antenna 64, can be connected to the sensor, communications, and GPS LRU'S 65 by means of various power/data cable interface 54 connections. The sensor mounting fairing 66, and/or articulated electro optical/radar gimbal 68, can also be installed and connected to the sensor, communications, and GPS LRU'S 65. Electrical and data system diagnostics on various control elements, sensors, communication systems and LRU's can be performed to verify operational status before system pressurization and retardant transfer begins.

Prior to commencing the transfer of retardant or water, the right side paratroop door (if there is one) can be opened, and the right fill/overfill pipe 5 can be articulated into place about the axis of the right fill/overfill pipe hinge assembly 6 to insure that overflow, if any, is jettisoned outside the aircraft. If required, at this juncture the foam concentrate tank 40 may also be filled through the foam fill port 43, and any overflow can be vented off board of the aircraft through the ground hose overfill pipe.

The transfer of retardant into the high pressure fluid reservoir tank 30 can be monitored by the loadmaster who observes the fill volume indicator and intercom jack 73 located on the outboard discharge manifold assembly 1. In the preferred embodiment of the present invention, upon completion of the filling operation the right fill/overfill pipe 5, if used, is retracted and stowed, and the right side paratroop door is closed while a left side, paratroop door is locked in the open position and replaced by a segmented door plug 81. The segmented door plug 81 can be capable of being pressurized, and the aircraft can be pressurized accordingly.

Before, during or after the transfer of retardant or water to the high pressure fluid reservoir tank 30, the compressor 50 can commence the transfer of high pressure compressed air to the high pressure air reservoir tank 20 to charge the system. If the retardant filling operation is complete before the high pressure fluid reservoir tank 30 is fully charged, the compressor 50 can be shut down and pressurization reinitiated after the host aircraft takes off to complete tank pressurization in route to the fire. Compression of high pressure air reservoir tank 20 can also be undertaken prior to filling the high pressure fluid reservoir tank 30.

Once the host aircraft is over the fire various line of sight communications can be initiated with the on-scene commander, which would result in the host aircraft providing GPS coordinates, sensing, and optimal targeting data, including a hyperspectral/infra red optical sensor 62, ballistic winds LIDAR/ranging laser 63, and video camera/spotting scope 67, and/or other sensors systems.

Once retardant route planning has been completed and hazards identified, the data can be viewed on the cockpit LCD targeting display 72, and transmitted to the on-scene commander and/or relayed to other parties of interest through satellite based communication means. Based upon experience, dynamic sensor analysis, fire modeling, and/or input from on-scene staff, a determination can be made as to how much retardant should be delivered over a specific distance to achieve the desired ground based dispersal trajectory and density. Based upon this optimal response determination, the pintel 10 and associated aperture flow control assembly 7, and/or the foam injection module 41, can be electrically and/or hydraulically actuated by manipulating the quantity selector switch 76, and other controls located on the cockpit control/display interface assembly 71, FIG. 9, or the loadmaster control interface assembly 79, FIG. 10, or alternatively by depressing the joystick trigger 77, located on the joystick 78, FIG. 8 to achieve release of the retardant or water, within the desired flow rates, and with the infusion of ancillary chemicals or foam as required.

Once the initial run has begun, the cockpit LCD targeting display 72, can provide a moving map display with visual, and/or audible cues to the flight crew as to their proximity from the target and when the retardant should be jettisoned.

The term "riding the button" is used when the flight crew selects the desired coverage level from the "ALL" position on the quantity selector switch 76. Then the drop button is used to start and stop the flow of retardant based on geographical features, (i.e. from a road to a ridge line etc.) or GPS coordinates.

While preferred embodiments of the present invention have been shown and described, various substitutions and modifications may be made without departing from the spirit and scope of the invention. Accordingly it is to be understood that the present invention has been described by way of illustration and not limitation.

What is claimed is:

1. A firefighting apparatus capable of temporary installation and adapted for use in a host aircraft comprising a fuselage defining an interior and an exterior, said firefighting apparatus comprising a retardant tank disposed in the interior of the host aircraft, and an ejection tube in fluid communication with said retardant tank, and a door plug for mounting within a fuselage orifice in the host aircraft, said door plug providing for fluid communication of retardant from said retardant tank through said ejection tube to the exterior of the host aircraft, wherein said door plug can be temporarily installed permitting the interior of the host aircraft to be pressurized.

2. The firefighting apparatus of claim 1, wherein said door plug comprises a pressurizeable seal around said ejection tube assembly.

3. The firefighting apparatus of claim 1, wherein said door plug comprises at least two segments.

4. The apparatus of claim 1, wherein said firefighting apparatus is mounted on a pallet.

5. The apparatus of claim 4, wherein said pallet is adapted for roll on capability to the interior of the host aircraft.

6. The apparatus of claim 1, wherein a portion of said ejection tube is disposed exterior to the host aircraft and is adapted to be oriented in a rearward and downward orientation with respect to the host aircraft.

7. The apparatus of claim 1, wherein said retardant tank can be pressurized.

8. The apparatus of claim 1, further comprising a compressor connected to said retardant tank to effect pressurization of said retardant tank.

9. The apparatus of claim 8, further comprising a compressed air storage reservoir disposed intermediate said compressor and said retardant tank.

10. The apparatus of claim 9 wherein said compressed air storage reservoir comprises a plurality of high pressure overfill rupture discs.

11. The apparatus of claim 1, further comprising a foam and chemical additive tank connected for controlled input of foam and chemical additives to said retardant tank.

12. The apparatus of claim 1, further comprising at least one sensor operably connected to said firefighting apparatus to effect user-discernable data for effecting retardant delivery.

13. The apparatus of claim 1, further comprising line of sight and over the horizon communications and data transmission capability.

14. The apparatus of claim 13, wherein one of said sensors is a transceiver, said transceiver being a GPS positioning assembly.

15. The apparatus of claim 1, wherein the host aircraft is a fixed or rotary wing aircraft with at least one oversized cargo door capable of accommodating the transit of a 463L or like cargo mounting pallet.

16. The apparatus of claim 1, wherein said door plug comprises a mounting collar for said ejection tube for providing fluid communication through said door plug from the interior to the exterior of the host aircraft.

17. The apparatus of claim 1, wherein said door plug incorporates an observation window and a horizontally disposed GPS blade antenna.

18. The apparatus of claim 1, wherein said retardant tank comprises a high-pressure air expansion horn and diffuser.

19. The apparatus of claim 1, wherein said retardant tank comprises a fluids collection sump to facilitate complete ejection of all fluids.

20. The apparatus of claim 19 wherein said fluids collection sump of said retardant tank is attached to said fluid ejection tube.

21. The apparatus of claim 1 wherein said retardant tank comprises a retractable, fill/overfill pipe discharge assembly which can translate from the interior to the exterior of the host aircraft during fluid transfer operations.

22. The apparatus of claim 1 wherein said fluid ejection tube comprises a fill/overfill pipe discharge port external to the host aircraft.

23. The apparatus of claim 22 wherein said ejection tube comprises a fill indicator panel with intercom connection external to the host aircraft.

24. The apparatus of claim 1 wherein said ejection tube comprises a pintle nozzle, said pintle nozzle being capable of variable flow and constant flow rate.

25. The apparatus of claim 1 wherein said ejection tube comprises a foam and chemical additive injection module.

26. The apparatus of claim 25 wherein said foam and chemical injection module is connected to a foam and chemical additive tank.

27. The apparatus of claim 1, further comprising an electro-optical and radar sensor fire targeting and assessment assembly attached to an externally-disposed section of said ejection tube.

28. The apparatus of claim 1, further comprising an externally mounted, fully articulated electro-optical and radar sensor gimbal turret fire targeting and assessment assembly attached to an externally-disposed section of said ejection tube.

29. The apparatus of claim 1, further comprising a fuselage upper ditching hatch capable of temporary installation and which comprises an antenna selected from the group consisting of: a line of sight communications antenna, an over the horizon satellite communications and data transmission antenna, and a global positioning satellite system antenna connected to a transceiver/processor LRU.

30. The apparatus of claim 1, further comprising a control interface assembly.

31. The apparatus of claim 30, wherein said control interface assembly is affixed to an operator chair mounted to a pallet assembly.

32. The apparatus of claim 30, wherein said control interface assembly is adapted for temporarily installation within the cockpit of the host aircraft.

33. The apparatus of claim 30, wherein said control interface assembly comprises a handheld joystick with selectable discharge trigger to effect user definable release of firefighting retardant.

34. The apparatus of claim 30, wherein said control interface assembly incorporates a plurality of seats adapted for crew seating.

* * * * *

UNITED STATES PATENT AND TRADEMARK OFFICE
CERTIFICATE OF CORRECTION

| | | |
|---|---|---|
| PATENT NO. | : 7,165,627 B2 | Page 1 of 1 |
| APPLICATION NO. | : 10/755088 | |
| DATED | : January 23, 2007 | |
| INVENTOR(S) | : Hutter et al. | |

It is certified that error appears in the above-identified patent and that said Letters Patent is hereby corrected as shown below:

On the title page (54), delete the first two inventors Michael David Hutter and Steve Thomas Marine.

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,165,627 B2 | Page 1 of 1 |
| APPLICATION NO. | : 10/755088 | |
| DATED | : January 23, 2007 | |
| INVENTOR(S) | : Hutter et al. | |

It is certified that error appears in the above-identified patent and that said Letters Patent is hereby corrected as shown below:

On the title page (76), delete the first two inventors Michael David Hutter and Steve Thomas Marine.

This certificate supersedes the Certificate of Correction issued September 23, 2008.

Signed and Sealed this

Fourteenth Day of October, 2008

JON W. DUDAS
*Director of the United States Patent and Trademark Office*